(12) United States Patent
Gayondato et al.

(10) Patent No.: US 12,034,295 B2
(45) Date of Patent: Jul. 9, 2024

(54) INRUSH CURRENT PROTECTION CIRCUIT WITH NOISE IMMUNE LATCHING CIRCUIT

(71) Applicant: APPLETON GRP LLC, Rosemont, IL (US)

(72) Inventors: John Michael Dimacuha Gayondato, Cavite (PH); Jonathan Art Fulgencio Recaflanca, Quezon (PH); Ohvid Bartocillo Granaderos, Rizal (PH); Archie Boy Mendoza Magsombol, Batangas (PH)

(73) Assignee: Appleton Grp LLC, Rosemont, IL (US)

( * ) Notice: Subject to any disclaimer, the term of this patent is extended or adjusted under 35 U.S.C. 154(b) by 141 days.

(21) Appl. No.: 17/356,095

(22) Filed: Jun. 23, 2021

(65) Prior Publication Data

US 2022/0416535 A1 Dec. 29, 2022

(51) Int. Cl.
 *H02H 9/00* (2006.01)
 *H02H 9/02* (2006.01)
 *H02M 1/36* (2007.01)

(52) U.S. Cl.
 CPC ............ *H02H 9/001* (2013.01); *H02H 9/025* (2013.01); *H02M 1/36* (2013.01)

(58) Field of Classification Search
 CPC .......... H02H 9/001; H02H 9/025; H02M 1/36
 (Continued)

(56) References Cited

U.S. PATENT DOCUMENTS

| 5,146,398 | A | | 9/1992 | Vila-Masot et al. |
| 5,177,657 | A | * | 1/1993 | Baer ...................... H02H 3/331 |
| | | | | 361/45 |

(Continued)

FOREIGN PATENT DOCUMENTS

EP 0589559 A2 3/1994

OTHER PUBLICATIONS

Alois Steiner, "600 V CoolMOS(TM) P7—Infineon's most well balanced high voltage MOSFET technology", Dated Mar. 29, 2019.

(Continued)

*Primary Examiner* — Thienvu V Tran
*Assistant Examiner* — Sreeya Sreevatsa
(74) *Attorney, Agent, or Firm* — McDonnell Boehnen Hulbert & Berghoff LLP

(57) ABSTRACT

A device comprises a processor, a memory for storing instruction code that is executable by the processor, and power supply circuitry. The power supply circuitry is in communication with the processor. The power supply circuitry comprises voltage regulator circuitry, a capacitor, a current limiter, and a switch. The voltage regulator circuitry comprises an input electrically coupled to a voltage source and an output configured to provide a regulated voltage output. The capacitor is configured to store energy derived from the voltage source. The capacitor comprises a first node electrically coupled with the output of the voltage regulator circuitry. The current limiter is in electrical communication with a second node of the capacitor and configured to limit inrush current through the capacitor during a start-up phase of the power supply circuitry. The switch circuit is in electrical communication with the second node of the capacitor. Capacitor current flows through the switch when the switch circuit is in an ON state, substantially bypassing the current limiter. The switch is transitioned to the ON state (Continued)

when a particular control signal is applied to the switch circuit. The switch circuit is configured to remain in the ON state when the particular control signal is no longer applied to the switch circuit.

20 Claims, 5 Drawing Sheets

(58) Field of Classification Search
USPC .......................................................... 361/58
See application file for complete search history.

(56) References Cited

U.S. PATENT DOCUMENTS

| | | | |
|---|---|---|---|
| 5,930,130 A * | 7/1999 | Katyl ..................... | H02H 9/001 |
| | | | 323/908 |
| 6,452,365 B1 | 9/2002 | Majumdar et al. | |
| 6,714,429 B2 | 3/2004 | Phadke | |
| 6,862,201 B2 | 3/2005 | Hodge, Jr. | |
| 8,299,773 B2 * | 10/2012 | Jang ........................ | H02M 1/36 |
| | | | 323/299 |
| 8,395,354 B2 | 3/2013 | Sainton | |
| 8,612,073 B2 | 12/2013 | Fuji et al. | |
| 8,922,133 B2 | 12/2014 | Hausman, Jr. et al. | |
| 9,239,027 B2 | 1/2016 | Usui | |
| 9,438,131 B2 * | 9/2016 | Lee ......................... | H02M 7/04 |
| 9,513,681 B2 | 12/2016 | Wang et al. | |
| 10,355,474 B2 | 7/2019 | Okamoto | |
| 2003/0035311 A1 | 2/2003 | Phadke | |
| 2006/0274468 A1 * | 12/2006 | Phadke .................. | H02H 9/001 |
| | | | 361/93.1 |
| 2011/0006748 A1 * | 1/2011 | Jang ........................ | H02M 1/36 |
| | | | 323/299 |
| 2012/0200967 A1 * | 8/2012 | Mikolajczak .......... | H02H 9/025 |
| | | | 361/79 |
| 2016/0164429 A1 * | 6/2016 | Wang ..................... | H02H 9/001 |
| | | | 363/126 |
| 2017/0099011 A1 * | 4/2017 | Freeman ................. | H02M 7/06 |
| 2017/0244236 A1 | 8/2017 | Wu et al. | |

OTHER PUBLICATIONS

Jayent, "Simple Latch Circuit with Transistors", Dated May 5, 2016.

PTC Inrush Current Limiters, https://product.tdk.com/en/products/protection/current/ptc-limiter/index.html, Retrieved on Jun. 22, 2021.

* cited by examiner

INRUSH CURRENT PROTECTION CIRCUIT WITH NOISE IMMUNE LATCHING CIRCUIT

BACKGROUND

Field

This application generally relates to power supply systems in electronic devices. In particular, this application describes an inrush current protection circuit with a noise immune latching circuit for a power supply.

Description of Related Art

Power supplies for converting, for example, household line voltage to various AC and DC operating voltages are oftentimes integrated within a device. For instance, a typical television includes a power supply configured to convert an AC line voltage (e.g., 120 VAC, 240 VAC, etc.) to one or more DC voltages (e.g., +5 V, +12 V, −12 V, etc.). The front end of the power supply may include a rectifier to convert the AC line voltage to a DC voltage. An example of the input side of the rectifier is electrically coupled to the AC line voltage, and an example of the output side of the rectifier is electrically coupled to a relatively large capacitor (e.g., bulk capacitor) configured to minimize ripple voltage on the output side of the rectifier.

The voltage across the bulk capacitor is normally zero or close to zero before the start-up of the power supply. When the power supply is activated, a large amount of current (e.g., inrush current) is directed into the bulk capacitor. This inrush current decreases as the voltage across the bulk capacitor increases.

SUMMARY

In a first aspect, a device comprises a processor, a memory for storing instruction code that is executable by the processor, and power supply circuitry. The power supply circuitry is in communication with the processor. The power supply circuitry comprises voltage regulator circuitry, a capacitor, a current limiter, and a switch circuit. The voltage regulator circuitry comprises an input electrically coupled to a voltage source and an output configured to provide a regulated voltage output. The capacitor is configured to store energy derived from the voltage source. The capacitor comprises a first node electrically coupled with the output of the voltage regulator circuitry. The current limiter is in electrical communication with a second node of the capacitor and is configured to limit inrush current through the capacitor during a start-up phase of the power supply circuitry. The switch circuit is in electrical communication with the second node of the capacitor. Capacitor current flows through the switch circuit when the switch circuit is in an ON state, substantially bypassing the current limiter. The switch circuit is transitioned to the ON state when a particular control signal is applied to the switch circuit. The switch circuit is configured to remain in the ON state when the particular control signal is no longer applied to the switch circuit.

In a second aspect, power supply circuitry comprises voltage regulator circuitry, a capacitor, a current limiter, and a switch circuit. The voltage regulator circuitry comprises an input electrically coupled to a voltage source and an output configured to provide a regulated voltage output. The capacitor is configured to store energy derived from the voltage source. The capacitor comprises a first node electrically coupled with the output of the voltage regulator circuitry. The current limiter is in electrical communication with a second node of the capacitor and is configured to limit inrush current through the capacitor during a start-up phase of the power supply. The switch circuit is in electrical communication with the second node of the capacitor. Capacitor current flows through the switch circuit when the switch circuit is in an ON state, substantially bypassing the current limiter. The switch circuit is transitioned to the ON state when a particular control signal is applied to the switch circuit. The switch circuit is configured to remain in the ON state when the particular control signal is no longer applied to the switch circuit.

In a third aspect, a method for preventing power supply failure comprises charging a capacitor of a device during a start-up stage responsive to the application of a voltage source to the device. During the start-up stage, an inrush current flows into the capacitor. During the start-up stage, the inrush current is routed through a current limiter. A particular control signal is subsequently applied to a switch circuit electrically coupled to the capacitor. The switch circuit is configured to transition to an ON state when the particular control signal is applied. Current flow through the capacitor substantially flows through the switch circuit when the switch circuit is in the ON state. The switch circuit is maintained in the ON state when the particular control signal is no longer applied to the switch circuit.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
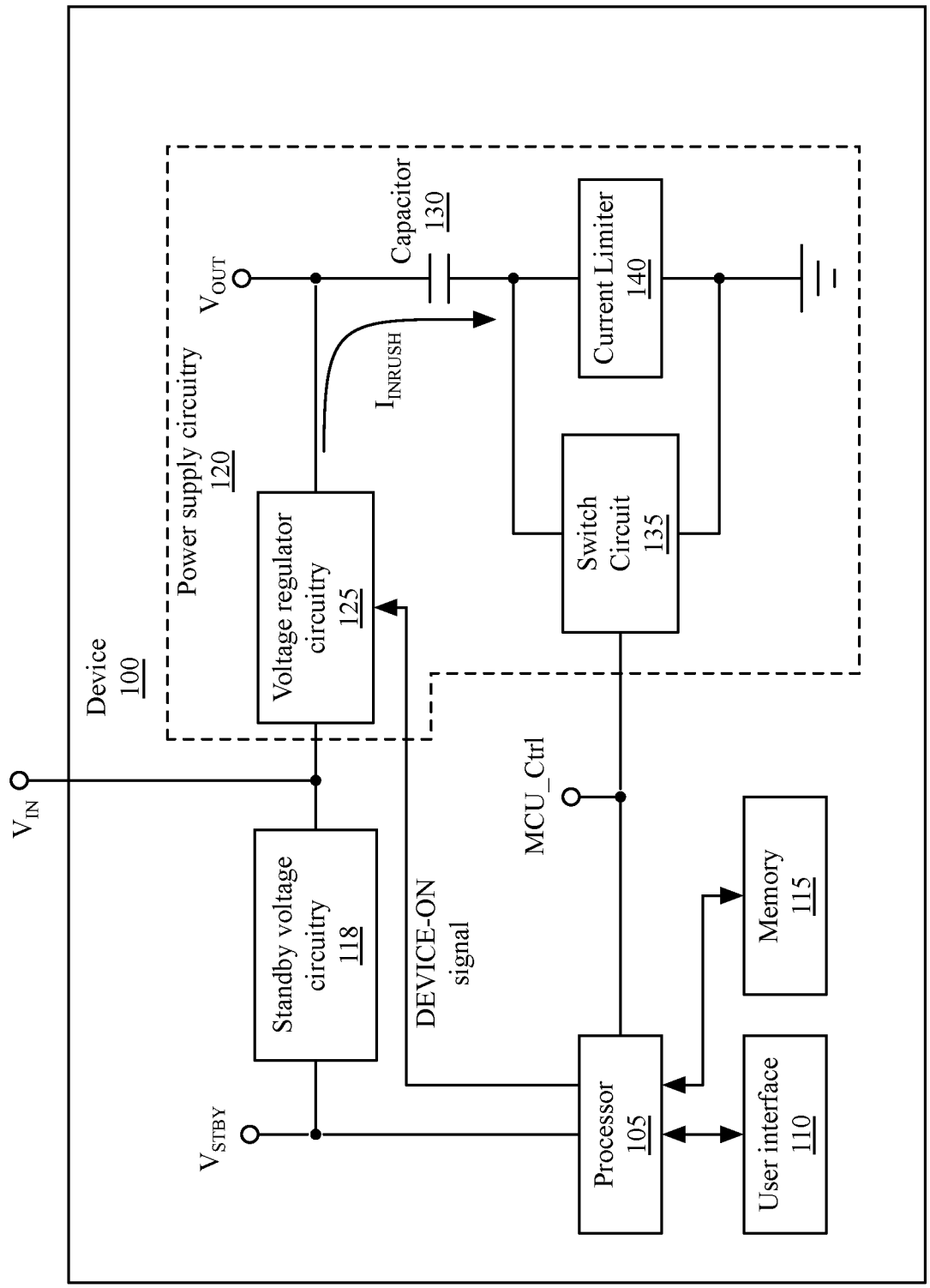
FIG. 1 illustrates a device that derives power from a line voltage such as 120 VAC, 240 VAC, etc., household voltage, in accordance with an example.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

Further, terms such as "A coupled to B," "A electrically coupled to B," etc., do not necessarily mean that items A and B are directly coupled to one another. For example, a first component electrically coupled to a second component is interpreted to mean that the components are either directly coupled (e.g., via a conductor) or coupled to one another via one or more resistors, capacitors, inductors, transistors, amplifiers, and/or other active or passive components.

I. Introduction

As noted above, during the start-up of some device power supplies, a large amount of current (e.g., inrush current) is directed into a bulk capacitor. This inrush current can, in some cases, result in damage to the power supply circuitry and/or other circuitry of the device. To mitigate this issue, some power supply circuits incorporate current limiting circuitry configured to control the amount of inrush current. An example of such a circuit comprises a thermistor and a switch in parallel with the thermistor. In operation, the inrush current flowing through the capacitor also flows through the thermistor. As the thermistor heats up, its resistance increases and, thereby, reduces the inrush current flowing through the capacitor. The inrush current ceases once the capacitor is fully charged. At this stage, the switch is closed to provide the capacitor with a low impedance path through which capacitor current can flow during normal operation.

In some examples, the switch closes in response to a control signal (e.g., 0 V=open, 5V=closed). However, in some instances, noise can be introduced into the control signal, such as when a power surge occurs. This noise can cause the control signal to change state, which in turn can cause the switch to open during the power surge. When this happens, the switch can enter into an unstable state, and the voltage across the switch can increase beyond the ratings of the switch. In some cases, this can damage the switch.

Examples of circuits that mitigate these issues are described below. Generally, the circuits comprise a current limiter and a switch circuit. The switch circuit changes state in response to a control signal. The switch circuit comprises a latch circuit that prevents the switch from cycling between opened and closed states, which can otherwise occur when noise is introduced into the control signal.

FIG. 1 illustrates an example of a device 100 that derives power from a line voltage such as 120 VAC, 240 VAC, etc., household voltage. The device 100 comprises a processor 105, a memory 115 for storing instruction code that is executable by the processor 105, a user interface 110, standby voltage circuitry 118, and power supply circuitry 120.

An example of the processor 105 is in communication with the memory 115. The processor 105 is configured to execute instruction code stored in the memory 115. Examples of the processor 105 include Intel®, AMD®, ARM®, PowerPC®, etc. processors. An example of the instruction code implements an operating system, such as Linux®, Android®, etc. The instruction code facilitates performing, by the device, various operations examples of which are described below. In this regard, the instruction code can cause the processor 105 to control and coordinate various activities performed by the different subsystems of the device.

An example of the user interface 110 comprises display circuitry, audio circuitry, user input circuitry, etc. An example of the display circuitry includes a liquid crystal display (LCD), a light-emitting diode display (LED) display, etc. An example of the display includes a transparent capacitive touch that facilitates receiving user commands. In this regard, an example of the display circuitry is configured to present a graphical user interface (GUI) that facilities specifying information by the user. An example of the audio circuitry includes one or more digital-to-analog converters (DAC), analog-to-digital converters (ADC), amplifiers, speakers, microphones, etc.

An example of the standby voltage circuitry 118 is configured to convert voltage received via a voltage source, such as a line voltage, to a standby voltage. In an example, the standby voltage corresponds to a relatively low voltage capable of powering just those parts of the device 100 (e.g., the processor 105 and the memory 115) that are necessary to perform the most basic functions of the device 100 (e.g., starting up of the main power supply). For instance, an example of the standby voltage circuitry 118 is configured to convert the line voltage of the device 100 to a standby voltage of, e.g., +5 VDC, +12 VDC, etc., at, e.g., 500 mA.

An example of the power supply circuitry 120 is configured to convert the line voltage to a regulated voltage capable of providing power to the main subsystems of the device 100. For example, in the case of a television, the power supply circuitry 120 is configured to power the display system, audio system, and any other systems that require a relatively large amount of power. An example of the power supply circuitry 120 is configured to activate and provide power in response to receiving a DEVICE-ON signal communicated from the processor 105.

An example of the power supply circuitry 120 comprises voltage regulator circuitry 125, a capacitor 130 (e.g., bulk capacitor), a switch circuit 135, and a current limiter 140.

In an example, the voltage regulator circuitry 125 comprises an input electrically coupled to a voltage source and an output configured to provide a regulated voltage output. For instance, in an example, the input of the voltage regulator circuitry 125 is electrically coupled to a line voltage (e.g., 120 VAC, 240 VAC, etc.). An example of the voltage regulator circuitry 125 corresponds to a linear regulator, a switch-mode regulator, etc., and is configured to output a DC voltage (e.g., 380 VDC).

An example of the capacitor 130 comprises a first node in electrical communication with the output of the voltage regulator circuitry 125 and is configured to store energy derived from the voltage source. Following the example above, an example of the capacitor 130 is configured to withstand a voltage potential in excess of 380 VDC and has a capacitance selected to minimize ripple voltage on the output of the voltage regulator circuitry 125, such as 440 µF.

An example of the current limiter 140 is electrically coupled to a second node of the capacitor 130 and is configured to limit inrush current through the capacitor 130 during a start-up phase of the power supply circuitry 120. In an example, the current limiter 140 corresponds to a polymeric positive temperature coefficient device (PPTC). An example of the PPTC device comprises a non-conductive crystalline organic polymer matrix that is loaded with carbon-black particles. When the PPTC device is cool, the carbon-black particles form conductive pathways that make the PPTC device conductive. As the PPTC device heats up, the polymer expands and changes from a crystalline state into an amorphous state. This change causes the carbon-black particles to separate and, therefore, breaks the conductive pathways. The breaking of the pathways increases the resistance of the PPTC device, which in turn increases the amount of heat dissipated by the PPTC device. The amount of current flow through the PPTC device decreases as the resistance of the PPTC device increases. This process continues until the current through the PPTC device decreases to a relatively small leakage amount.

An example of the switch circuit 135 is electrically coupled to the second node of the capacitor 130. When the switch circuit 135 is in an actuated or ON state, capacitor 130 current flows through the switch circuit 135, substantially bypassing the current limiter 140. An example of the switch circuit 135 is actuated in response to a control signal (e.g., 0 volts) communicated via node MCUP_Ctrl. The switch circuit 135 is configured to remain in the actuated state when the control signal is no longer applied (e.g., changes state to 5 volts).

Figure 2:
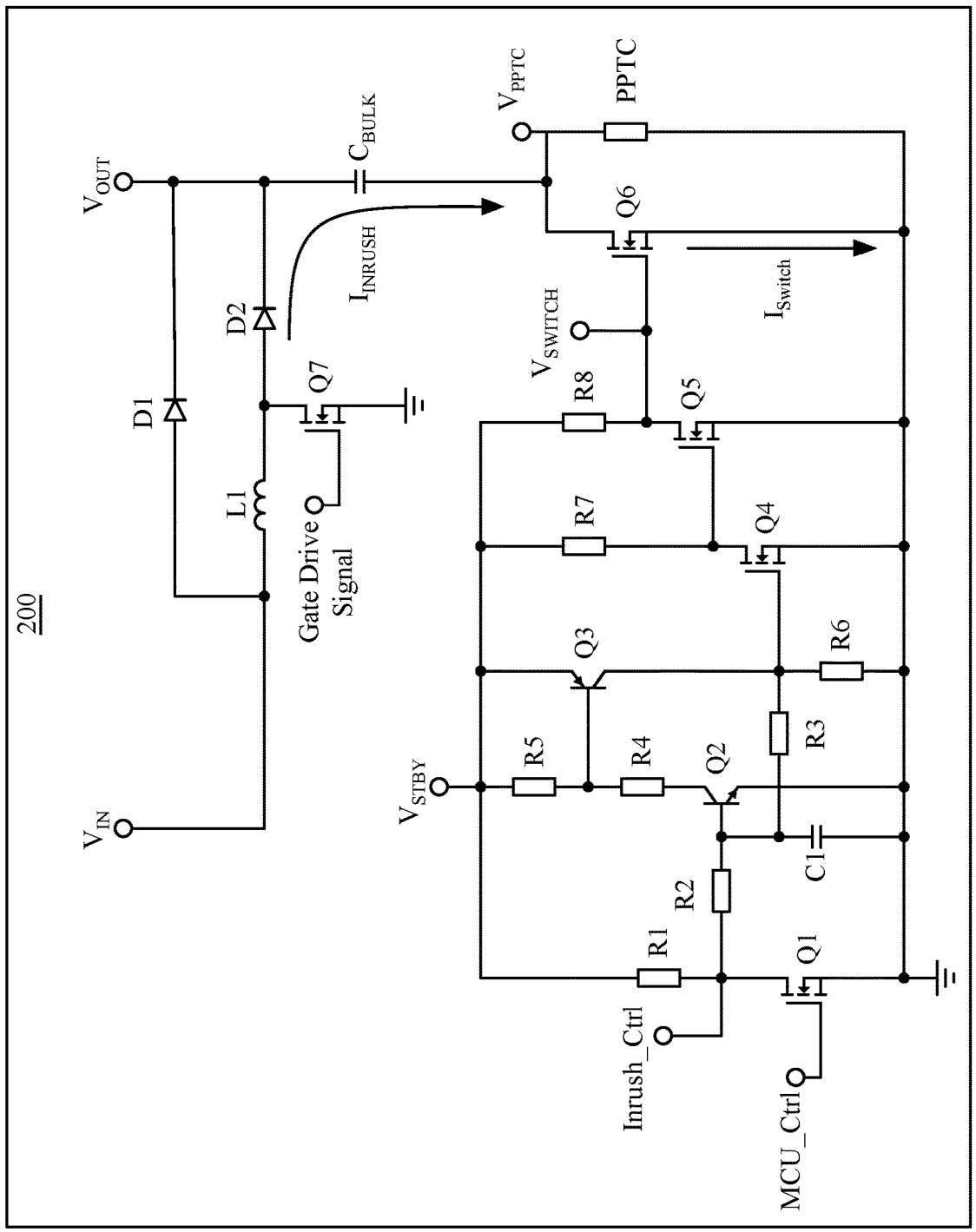
FIG. 2 is a schematic diagram of power supply circuitry of the device, in accordance with an example.

FIG. 2 is a schematic diagram 200 of an example of the power supply circuitry 120. Referring to FIG. 2, a first node of inductor L1 and a first node of diode D1 are electrically coupled to node $V_{IN}$. In an example, node $V_{IN}$ corresponds to a rectified version of one phase of a line voltage (e.g., 120 VAC, 240 VAC, etc.).

An example of transistor Q7 corresponds to a MOSFET (i.e., metal-oxide-semiconductor field-effect transistor). The gate of transistor Q1 is electrically coupled to a gate drive signal. The source of transistor Q1 is electrically coupled to a ground potential (hereinafter ground). The drain of transistor Q1 is electrically coupled to a second node of inductor L1 and to a first node of diode D2. A second node of diode D1 and a second node of diode D2 are electrically coupled to node $V_{OUT}$, which is electrically coupled to a first node of bulk capacitor $C_{BULK}$. In an example, node $V_{OUT}$ corresponds to the output of the power supply circuitry (e.g., the output that is electrically coupled to and powers other peripherals of the device 100). The configuration of the components described above implements a boost converter. In this regard, in an example, the gate drive signal corresponds to a pulse width modulated signal where the width of the pulse is dynamically adjusted to maintain the voltage of node $V_{OUT}$ at a particular DC voltage.

The second node of capacitor $C_{BULK}$ is electrically coupled to a drain node of transistor Q6 and a first node of a PPTC device. Further aspects of these components are described below.

An example of transistor Q1 corresponds to a MOSFET. The gate of transistor Q1 is electrically coupled to node MCU_Ctrl through which the control signal for actuating or turning on the switch circuit 135 is applied. The source of transistor Q1 is electrically coupled to ground. The drain of transistor Q1 is electrically coupled to a first node of resistor R1 and a first node of resistor R2. A second node of resistor R1 is coupled to node $V_{STBY}$. In an example, the voltage at node $V_{STBY}$ corresponds to the standby voltage described above. Transistor Q1 and resistor R1 together implement an inverter that inverts the polarity of the control signal received at node MCU_Ctrl. For example, when the control signal is low (e.g., below the $V_{GS}$ threshold of transistor Q1), the voltage at the drain of transistor Q1 is high (e.g., equal to the voltage at node $V_{STBY}$). When the control signal is high (e.g., above the $V_{GS}$ threshold of transistor Q1), the voltage at the drain of transistor Q1 is low (e.g., equal to the ground potential).

An example of transistor Q2 corresponds to an N-type BJT (i.e., an NPN type bipolar junction transistor). The base of transistor Q2 is electrically coupled to a second node of resistor R2, a first node of capacitor C1, and a first node of resistor R3. The emitter of transistor Q2 is electrically coupled to ground. The collector of transistor Q2 is electrically coupled to a first node of resistor R4. A second node of resistor R4 is electrically coupled to a first node of resistor R5. A second node of resistor R5 is electrically coupled to node $V_{STBY}$.

Resistor R2 and capacitor C1 implement an RC filter. In an example, the values of resistor R2 and capacitor C1 are selected to filter any potential noise that may be induced onto the control signal, and that would cause premature activation of the switch circuitry. For instance, an example of the values of resistor R2 and capacitor C1 are selected to implement a first-order low pass filter having a cutoff frequency of less than 10 Hz.

An example of transistor Q3 corresponds to a P-type BJT (i.e., a PNP type bipolar junction transistor). The base of transistor Q3 is electrically coupled to the second node of resistor R4 and the first node of resistor R5. The emitter of transistor Q3 is electrically coupled to node $V_{STBY}$. The collector of transistor Q3 is electrically coupled to a second node of resistor R3, a first node of resistor R6, and the gate of transistor Q4. A second node of resistor R6 is electrically coupled to ground.

An example of transistor Q4 corresponds to a MOSFET. The gate of transistor Q4 is electrically coupled to the first node of resistor R6. The source of transistor Q4 is electrically coupled to ground. The drain of transistor Q4 is electrically coupled to a first node of resistor R7. A second node of resistor R7 is coupled to node $V_{STBY}$. Transistor Q4 and resistor R7 together implement an inverter that inverts the polarity of the signal at the first node of resistor R6. For example, when the voltage at the first node of resistor R6 is low (e.g., below the $V_{GS}$ threshold of transistor Q4), the voltage at the drain of transistor Q4 is high (e.g., equal to the voltage at node $V_{STBY}$). When the voltage at the first node of resistor R6 is high (e.g., above the $V_{GS}$ threshold of transistor Q4), the voltage at the drain of transistor Q4 is low (e.g., equal to the ground potential).

An example of transistor Q5 corresponds to a MOSFET. The gate of transistor Q5 is electrically coupled to the first node of resistor R7. The source of transistor Q5 is electrically coupled to ground. The drain of transistor Q5 is electrically coupled to a first node of resistor R8. A second node of resistor R8 is electrically coupled to node $V_{STBY}$. Transistor Q5 and resistor R8 together implement an inverter that inverts the polarity of the signal at the first node of resistor R7. For example, when the voltage at the first node of resistor R7 is low (e.g., below the $V_{GS}$ threshold of transistor Q5), the voltage at the drain of transistor Q5 is high (e.g., equal to the voltage at node $V_{STBY}$). When the voltage at the first node of resistor R7 is high (e.g., above the $V_{GS}$ threshold of transistor Q5), the voltage at the drain of transistor Q5 is low (e.g., equal to the ground potential).

An example of transistor Q6 corresponds to a MOSFET. The gate of transistor Q6 is electrically coupled to the first node of resistor R8. The source of transistor Q6 is electrically coupled to ground and to a first node of the PPTC device. The drain of transistor Q6 is electrically coupled to a second node of capacitor $C_{BULK}$ and to a second node of the PPTC device. Transistor Q6 is configured as a bypass switch to bypass the PPTC when controlled to do so via the control signal. When the voltage at the first node of resistor R8 is low (e.g., below the $V_{GS}$ threshold of transistor Q5), transistor Q6 is in an open state (i.e., high impedance state, OFF state, etc.). When the voltage at the first node of resistor R8 is high (e.g., above the $V_{GS}$ threshold of transistor Q6), transistor Q6 is in a closed state (i.e., low impedance state, actuated, ON state, etc.), current flow through the capacitor $C_{BULK}$ flows through transistor Q6.

Transistor Q2 and transistor Q3, along with resistor R2, R4, R5, R3, R6, and capacitor C1, implement a latch circuit. In operation, during an initial state, when the control signal is at a high state (e.g., above the $V_{GS}$ threshold of transistor Q1), the drain of transistor Q1 is low (e.g., equal to about ground potential). The voltage input to the base of transistor Q2 will depend on the values of resistors R2, R3, R6, the voltage at the first node of resistor R2, and the voltage across resistor R6. In the initial state, it is assumed that the voltage across resistor R6 is about zero. In this case, the voltage input to the base of transistor Q2 is below the $V_{BE}$ threshold of transistor Q2 and, therefore, transistor Q2 will be in an open state (e.g., a high impedance state). When transistor Q2 is in the open state, the voltage at the collector of transistor Q2 will be high (e.g., equal to about the voltage at node $V_{STBY}$). Therefore, the $V_{BE}$ junction of transistor Q3 will be less than the $V_{BE}$ threshold voltage of transistor Q3 and transistor Q3 will be in the open state (e.g., high impedance state). The voltage across resistor R6 will therefore be low (e.g., about zero).

When the control signal transitions to a low state (e.g., below the $V_{GS}$ threshold of transistor Q1), the drain of transistor Q1 transitions to a high state (e.g., about equal to the voltage at node $V_{STBY}$). As noted above, the voltage input to the base of the transistor will depend on the values of resistors R2, R3, R6, the voltage at the first node of resistor R2 and the voltage across resistor R6. And as indicated above, the voltage across resistor R6 is initially about zero. The combination of resistors R2, R3, and R6 are selected so that under these conditions, the voltage input to the base of transistor Q2 transitions above the $V_{BE}$ threshold of transistor Q2 when the drain of transistor Q1 transitions to a high state. Under these conditions, therefore, the transistor Q2 will transition to a closed state (e.g., a low impedance state).

When transistor Q2 is in the closed state, the voltage at the collector of transistor Q2 will be low (e.g., about equal to the ground potential). Therefore, the magnitude of $V_{BE}$ of transistor Q3 will greater than the $V_{BE}$ threshold voltage of transistor Q3 and transistor Q3 will be in the closed state (e.g., low impedance state). The voltage across resistor R6 will therefore be high (e.g., about equal to the voltage of the Vstby node).

If the control signal were to inadvertently transition back to a high state (e.g., above the $V_{GS}$ threshold of transistor Q1), for example, due to induced noise on the control signal, inadvertent reset of the processor 105, etc., the drain of transistor Q1 will transition to a low state (e.g., about equal to the ground potential). Therefore, the voltage at the first node of resistor R2 will be at approximately ground potential. However, as noted above, the voltage input to the base of the transistor will depend on the values of resistors R2, R3, R6, the voltage at the first node of resistor R2 and the voltage across resistor R6. In this state, the voltage across resistor R6 is high (e.g., about equal to the voltage at node $V_{STBY}$). The combination of resistors R2, R3, and R6 are selected so that under these conditions, the voltage input to the base of transistor Q2 remains above the $V_{BE}$ threshold of transistor Q2, even when the drain of transistor Q1 transitions to a low state. Under these conditions, therefore, the transistor Q2 will remain in a closed state (e.g., a low impedance state). With Q2 remaining in the closed state, the voltage at the collector of transistor Q2 will remain low (e.g., about equal to the ground potential). Therefore, the magnitude of $V_{BE}$ of transistor Q3 will remain greater than the $V_{BE}$ threshold voltage of transistor Q3 and transistor Q3 will remain in the closed state (e.g., low impedance state). The voltage across resistor R6 will therefore remain in the high state (e.g., about equal to the voltage at node $V_{STBY}$), which ensures that the state of transistor Q2 and transistor Q3 remain in their respective states.

The latch circuit described above is configured to reset when, for example, the voltage at node $V_{STBY}$ is lowered (e.g., set to zero). In an example, this occurs when the voltage at node $V_{IN}$ of the device is lowered or removed.

FIGS. 3A-3D illustrate example waveforms associated with switch failure (e.g., failure of transistor Q6) that can occur when the power supply circuitry 120 does not include the latch circuit described above. That is, the failure mode illustrated in the waveforms can occur when the inrush control circuitry of the power supply circuitry 120 does not incorporate the latch circuit implemented by transistor Q2 and transistor Q3, along with resistor R2, R4, R5, R3, R6, and capacitor C1, as described above.

Figure 3A:
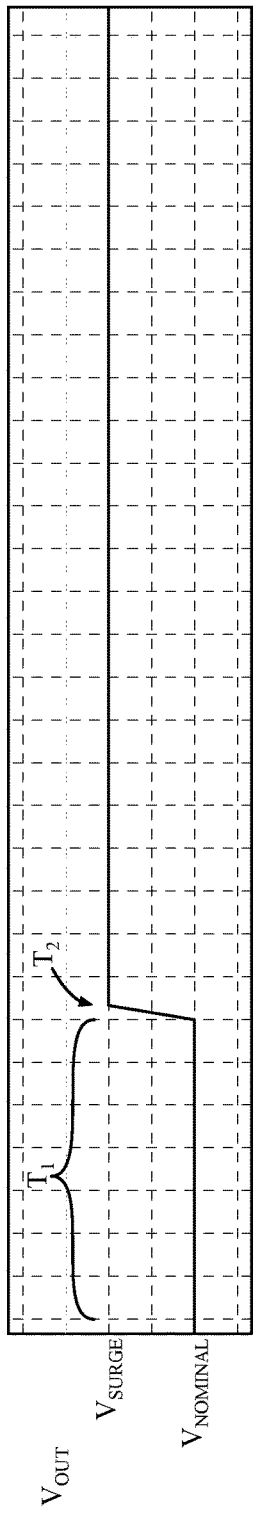
FIG. 3A illustrates the voltage at node $V_{OUT}$ of the power supply circuitry during a failure mode, in accordance with an example.
Figure 3B:
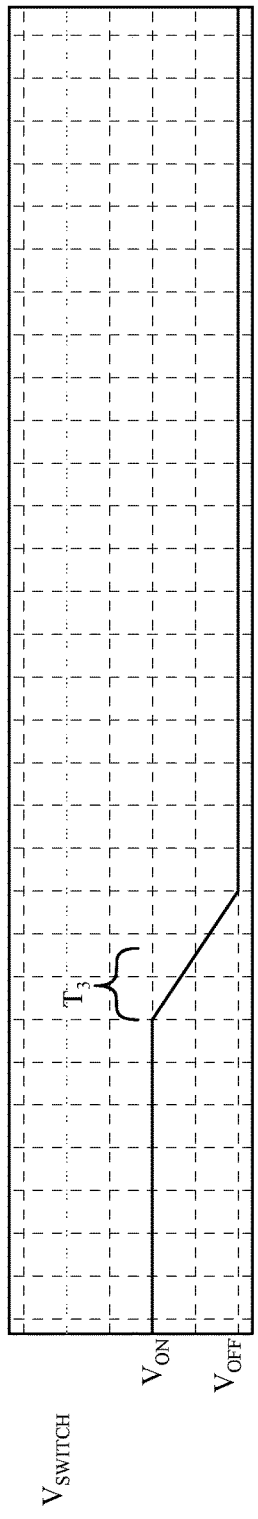
FIG. 3B illustrates the voltage at node $V_{SWITCH}$ of the power supply circuitry during the failure mode, in accordance with an example.
Figure 3C:
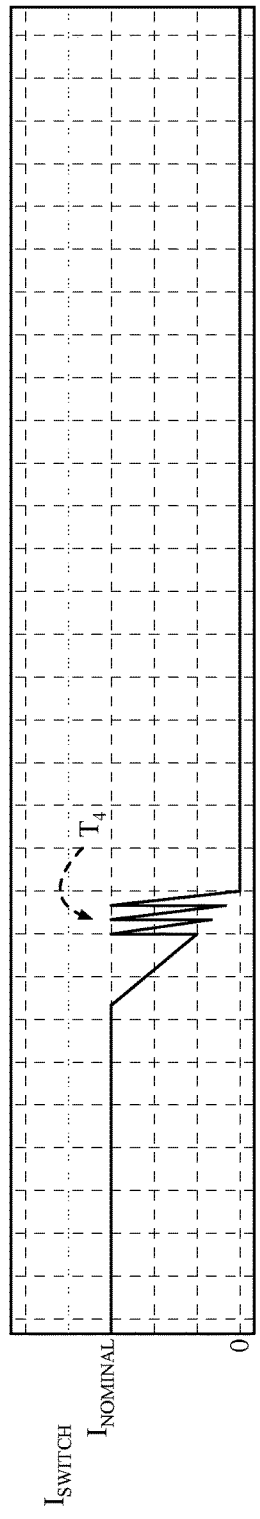
FIG. 3C illustrates the current $I_{SWITCH}$ flowing through a switch of the power supply circuitry during the failure mode, in accordance with an example.
Figure 3D:
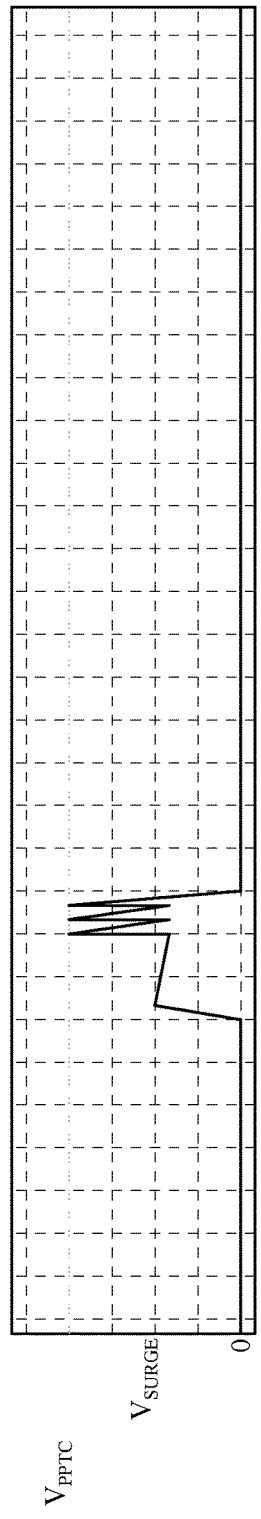
FIG. 3D illustrates the voltage at node $V_{PPTC}$ of the power supply circuitry during the failure mode, in accordance with an example.

FIG. 3A illustrates an example of the voltage at node $V_{OUT}$ of the power supply circuitry 120 during the failure mode. FIG. 3B illustrates an example of the voltage at node $V_{SWITCH}$ of the power supply circuitry 120 during the failure mode. FIG. 3C illustrates an example of the current $I_{SWITCH}$ flowing through the switch (e.g., transistor Q6) of the power supply circuitry 120 during the failure mode. FIG. 3D illustrates an example of the voltage at node $V_{PPTC}$ of the power supply circuitry 120 during the failure mode.

Referring to the figures, during period $T_1$, the voltage at node $V_{OUT}$ corresponds to $V_{NOMINAL}$ (e.g., a nominal operating voltage for the device 100). The voltage at node $V_{SWITCH}$ corresponds to an ON value (e.g., a voltage greater than the $V_{GS}$ threshold of transistor Q6). The current flowing through transistor Q6 corresponds to a nominal current. And the voltage at node $V_{PPTC}$ is about zero volts.

During period $T_2$, a voltage surge condition occurs (e.g., the voltage at node Vin suddenly increases due to a load imbalance on the line voltage). This, in turn, forward biases diode D1, which in turn increases the voltage at node $V_{OUT}$ to voltage $V_{SURGE}$. This also results in a corresponding increase at node $V_{PPTC}$ and across the drain and source of transistor Q6.

During period $T_3$, the surge causes the processor 105 of the device to reset, which controls transistor Q6 to start transitioning to an OFF state, as indicated by the voltage at node $V_{SWITCH}$ dropping. As this voltage falls, the current $I_{SWITCH}$ starts to drop.

During period $T_4$, high current intermittent switching occurs in the ohmic region of transistor Q6, as indicated in FIG. 3C. This causes a corresponding sudden increase in voltage at node $V_{PPTC}$ and across the drain and source of transistor Q6. This sudden increase damages and shorts transistor Q6, resulting in failure of the inrush current circuit.

Figure 4A:
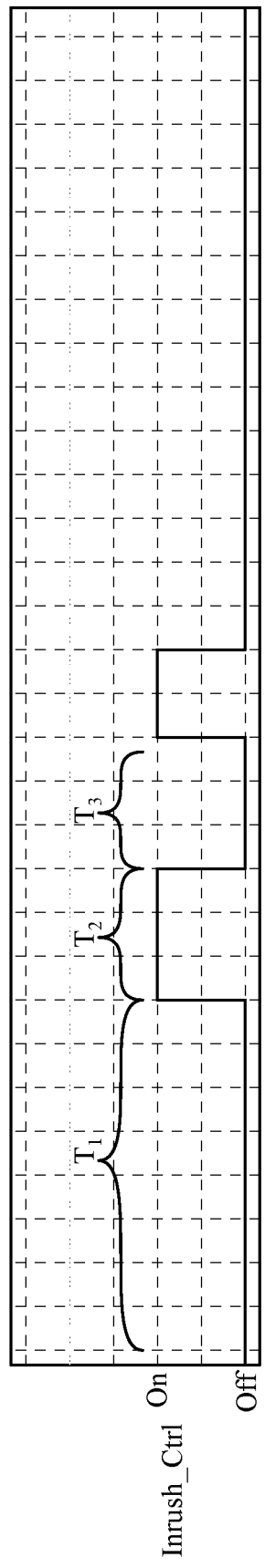
FIG. 4A illustrates the voltage at node Inrush_Ctrl during the failure mode, in accordance with an example.
Figure 4B:
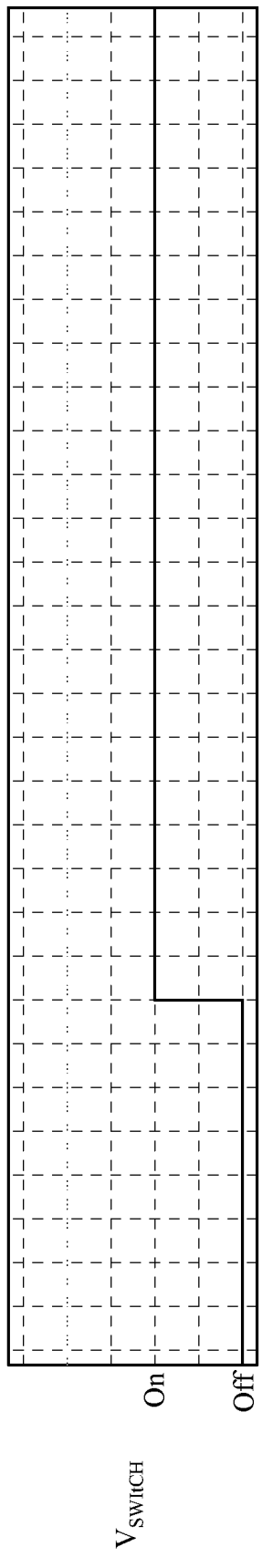
FIG. 4B illustrates the voltage at node $V_{SWITCH}$ of the power supply circuitry during the failure mode, in accordance with an example.

FIGS. 4A-4B illustrate examples of waveforms of the voltage at node Inrush_Ctrl and the voltage at node $V_{SWITCH}$ when the power supply circuitry 120 includes the latch circuit described above. FIG. 4A illustrates an example of the voltage at the node Inrush_Ctrl during a failure mode. In the example power supply circuitry 120, this voltage is inversely related to the voltage at node MCU_Ctrl. FIG. 4B illustrates an example of the voltage at node $V_{SWITCH}$ of the power supply circuitry 120 during the failure mode.

During period $T_1$, the voltage at node Inrush_Ctrl is in an OFF state (e.g., about zero volts), and the switch (e.g., transistor Q6) is in the OFF state (e.g., high-impedance state). For example, period $T_1$ can be the period after the device 100 is electrically coupled to a line voltage, and capacitor $C_{BULK}$ is charging.

During period $T_2$, the voltage at node Inrush_Ctrl transitions to an ON state. This, in turn, causes the switch to transition to the ON state (e.g., low impedance state). For example, period T2 can correspond to the period after which capacitor $C_{BULK}$ is sufficiently charged, and the inrush current has reduced to a relatively low level.

During period $T_3$, the voltage at node Inrush_Ctrl transitions to an OFF state. In an example, this occurs because the control signal communicated via node MCU_Ctrl transitioned to an ON state as the result of a processor 105 reset. The processor 105 reset may have occurred as the result of the voltage surge described above. However, the latch circuit of the power supply circuitry 120 prevents the switch (e.g., transistor Q6) from transitioning to the OFF state. This, in turn, prevents failure of the device 100 from occurring.

Figure 5:
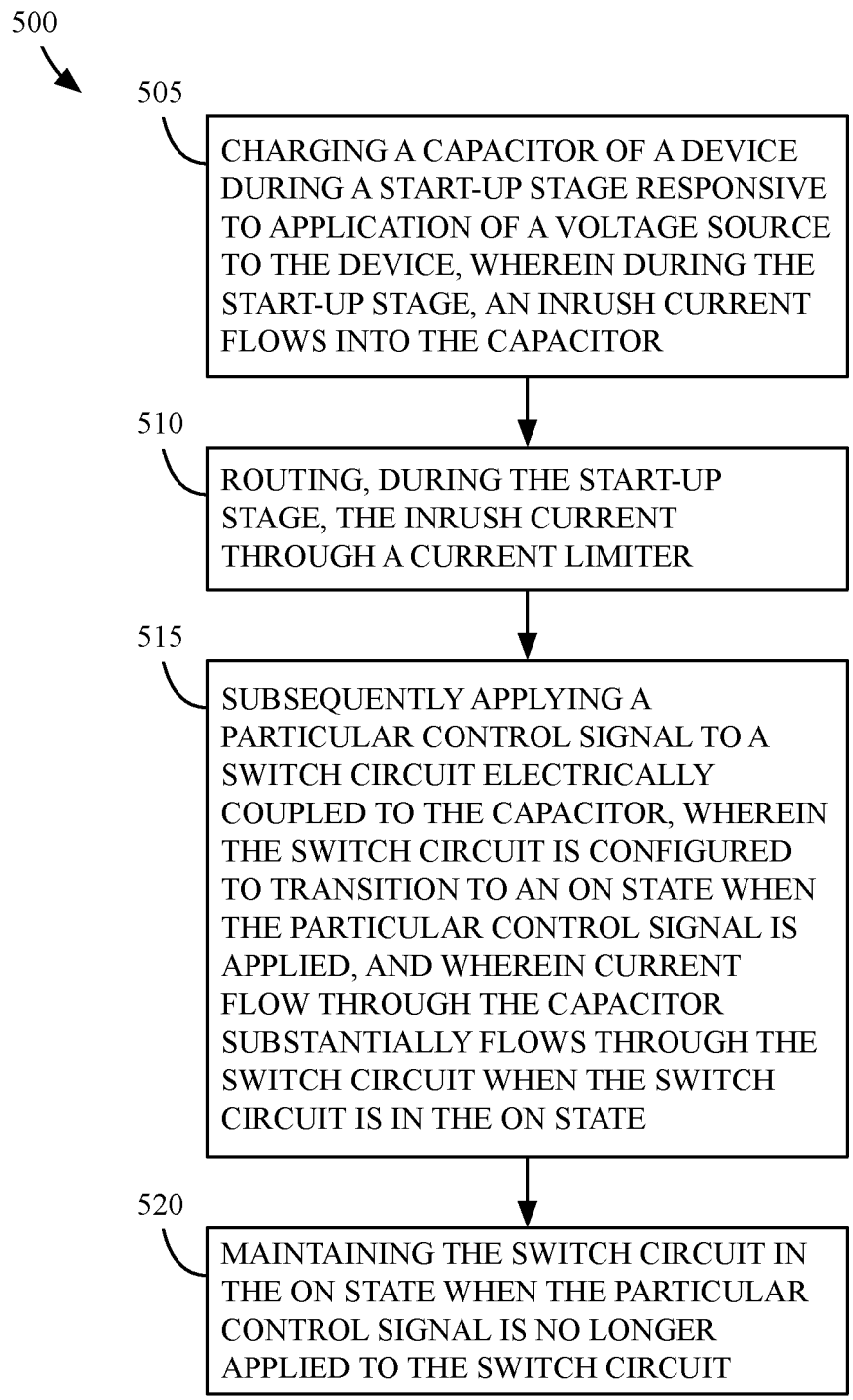
FIG. 5 illustrates operations that facilitate preventing failure of power supply circuitry, in accordance with an example.

FIG. 5 illustrates examples of operations 500 that facilitate preventing failure of power supply circuitry 120. The operations at block 505 involve charging a capacitor 130 of a device 100 during a start-up stage responsive to the application of a voltage source (e.g., $V_{IN}$) to the device 100. During the start-up stage, an inrush current, $I_{INRUSH}$, flows into the capacitor 130.

The operations at block 510 involve routing, during the start-up stage, the inrush current, $I_{INRUSH}$, through a current limiter 140.

The operations at block 515 involve subsequently applying a particular control signal to a switch circuit 135 electrically coupled to the capacitor 130. The switch circuit 135 is configured to transition to an ON state when the particular control signal is applied. Current flow through the capacitor 130 substantially flows through the switch circuit 135 when the switch circuit 135 is in the ON state.

The operations at block 520 involve maintaining the switch circuit 135 in the ON state when the particular control signal is no longer applied to the switch circuit 135.

In an example, the switch circuit 135 includes a switch device and a latch circuit. In this example, applying the particular control signal to the switch circuit 135 involves applying the particular control signal to the latch circuit. When the particular control signal is applied to the latch circuit, the latch circuit is configured to control the switch device to transition to an ON state. Further, maintaining the switch circuit 135 in the ON state when the particular control signal is no longer applied involves maintaining, by the latch circuit, the switch device in the ON state when the particular control signal is no longer applied to the switch circuit 135.

In an example, the operations involve resetting the latch circuit after the removal of the voltage source from the device 100. In this example, after removal of the voltage source, the switch device transitions to the OFF state.

In an example, the operations involve applying the particular control signal to the switch circuit 135 at a predetermined time after the voltage source is applied to the device.

In an example, the operations involve applying the particular control signal to the switch circuit 135 after the capacitor 130 is charged.

In an example, the operations involve applying the particular control signal to the switch circuit 135 after the voltage across the capacitor reaches 98% of a nominal operating voltage.

In an example, the current limiter 140 corresponds to a polymeric positive temperature control (PPTC) device.

In an example, the switch device corresponds to a metal-oxide-semiconductor field-effect transistor (MOSFET).

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A device comprising:
   a processor;
   memory for storing instruction code that is executable by the processor; and
   power supply circuitry in communication with the processor, wherein the power supply circuitry comprises:
   voltage regulator circuitry that comprises an input electrically coupled to a voltage source and an output configured to provide a regulated voltage output;
   a capacitor configured to store energy derived from the voltage source, wherein the capacitor comprises (1) a first terminal electrically coupled to the output of the voltage regulator circuitry and (2) a second terminal;
   a current limiter having a third terminal and a fourth terminal, the third terminal being connected to the second terminal of the capacitor to form a first node, the current limiter being configured to limit inrush current through the capacitor during a start-up phase of the power supply circuitry; and
   a switch circuit comprising a transistor having (1) a drain terminal that also forms the first node with the second terminal of the capacitor and the third terminal of the current limiter and (2) a source terminal that forms a second node with the fourth terminal of the current limiter, wherein capacitor current flows through the switch circuit when the switch circuit is in an ON state, substantially bypassing the current limiter, wherein the switch circuit is transitioned to the ON state when a particular control signal is applied to the switch circuit, wherein the switch circuit is configured to remain in the ON state when the particular control signal is no longer applied to the switch circuit.

2. The device according to claim 1, wherein the switch circuit includes a switch device and a latch circuit, wherein the latch circuit is configured to control the switch device to transition to an ON state when the particular control signal is applied to the switch circuit and to maintain the switch device in the ON state when the particular control signal is no longer applied to the switch circuit.

3. The device according to claim 2, wherein the latch circuit is configured to reset after removal of the voltage source, wherein after removal of the voltage source, the switch device transitions to the OFF state.

4. The device according to claim 2, wherein the switch device corresponds to a metal-oxide-semiconductor field-effect transistor (MOSFET).

5. The device according to claim 1, wherein the current limiter corresponds to a polymeric positive temperature control (PPTC) device.

6. The device according to claim 1, wherein the particular control signal is applied to the switch circuit a predetermined time after the voltage source is applied to the voltage regulator circuitry.

7. The device according to claim 1, wherein the particular control signal is applied to the switch circuit after the capacitor is charged.

8. The device according to claim 1, wherein the particular control signal is applied to the switch circuit after the regulated voltage output reaches 98% of a nominal operating voltage.

9. Power supply circuitry comprising:
voltage regulator circuitry that comprises an input electrically coupled to a voltage source and an output configured to provide a regulated voltage output;
a capacitor configured to store energy derived from the voltage source, wherein the capacitor comprises (1) a first node terminal electrically coupled to the output of the voltage regulator circuitry and (2) a second terminal;
a current limiter having a third terminal and a fourth terminal, the third terminal being connected to the second terminal of the capacitor to form a first node, the current limiter being configured to limit inrush current through the capacitor during a start-up phase of the power supply circuitry; and
a switch circuit comprising a transistor having (1) a drain terminal that also forms the first node with the second terminal of the capacitor and the third terminal of the current limiter and (2) a source terminal that forms a second node with the fourth terminal of the current limiter, wherein capacitor current flows through the switch circuit when the switch circuit is in an ON state, substantially bypassing the current limiter, wherein the switch circuit is transitioned to the ON state when a particular control signal is applied to the switch circuit, wherein the switch circuit is configured to remain in the ON state when the particular control signal is no longer applied to the switch circuit.

10. The power supply circuitry according to claim 9, wherein the switch circuit includes a switch device and a latch circuit, wherein the latch circuit is configured to control the switch device to transition to an ON state when the particular control signal is applied to the switch circuit and to maintain the switch device in the ON state when the particular control signal is no longer applied to the switch circuit.

11. The power supply circuitry according to claim 10, wherein the latch circuit is configured to reset after removal of the voltage source, wherein after removal of the voltage source, the switch device transitions to the OFF state.

12. The power supply circuitry according to claim 10, wherein the switch device corresponds to a metal-oxide-semiconductor field-effect transistor (MOSFET).

13. The power supply circuitry according to claim 9, wherein the current limiter corresponds to a polymeric positive temperature control (PPTC) device.

14. The power supply circuitry according to claim 9, wherein the particular control signal is applied to the switch circuit a predetermined time after the voltage source is applied to the voltage regulator circuitry.

15. The power supply circuitry according to claim 9, wherein the particular control signal is applied to the switch circuit after the capacitor is charged.

16. The power supply circuitry according to claim 13, wherein the particular control signal is applied to the switch circuit after the regulated voltage output reaches 98% of a nominal operating voltage.

17. A method for preventing power supply circuitry failure, the method comprising:
charging, via an output of a voltage regulator circuitry, a capacitor of a device during a start-up stage responsive to application of a voltage source to the device, wherein during the start-up stage, an inrush current flows into the capacitor, wherein the capacitor comprises (1) a first terminal electrically coupled to the output of the voltage regulator circuitry and (2) a second terminal;
routing, during the start-up stage, the inrush current through a current limiter having a third terminal and a fourth terminal, the third terminal being connected to the second terminal of the capacitor to form a first node;
subsequently applying a particular control signal to a switch circuit comprising a transistor having (1) a drain terminal that also forms the first node with the second terminal of the capacitor and the third terminal of the current limiter and (2) a source terminal that forms a second node with the fourth terminal of the current limiter, wherein the switch circuit is configured to transition to an ON state when the particular control signal is applied, and wherein current flow through the capacitor substantially flows through the switch circuit when the switch circuit is in the ON state; and
maintaining the switch circuit in the ON state when the particular control signal is no longer applied to the switch circuit.

18. The method according to claim 17, wherein the switch circuit includes a switch device and a latch circuit, wherein:
applying the particular control signal to the switch circuit comprises applying the particular control signal to the latch circuit, wherein when the particular control signal is applied to the latch circuit, the latch circuit is configured to control the switch device to transition to an ON state, and
maintaining the switch circuit in the ON state when the particular control signal is no longer applied comprises maintaining, by the latch circuit, the switch device in the ON state when the particular control signal is no longer applied to the switch circuit.

19. The method according to claim 18, wherein the method further comprises:

resetting the latch circuit after removal of the voltage source from the device, wherein after removal of the voltage source, the switch device transitions to the OFF state.

20. The method according to claim 17, further comprising applying the particular control signal to the switch circuit a predetermined time after the voltage source is applied to the device.

\* \* \* \* \*